(12) United States Patent
Gao et al.

(10) Patent No.: US 10,453,448 B2
(45) Date of Patent: Oct. 22, 2019

(54) METHOD AND DEVICE FOR MANAGING DIALOGUE BASED ON ARTIFICIAL INTELLIGENCE

(71) Applicant: BEIJING BAIDU NETCOM SCIENCE AND TECHNOLOGY CO., LTD., Beijing (CN)

(72) Inventors: Yuan Gao, Beijing (CN); Daren Li, Beijing (CN); Dai Dai, Beijing (CN); Qiaoqiao She, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/872,903

(22) Filed: Jan. 16, 2018

(65) Prior Publication Data
US 2019/0005948 A1    Jan. 3, 2019

(30) Foreign Application Priority Data

Jun. 29, 2017    (CN) .......................... 2017 1 0518293

(51) Int. Cl.
| | |
|---|---|
| *G10L 15/18* | (2013.01) |
| *G10L 15/22* | (2006.01) |
| *G10L 15/02* | (2006.01) |
| *G10L 15/16* | (2006.01) |
| *G06F 17/27* | (2006.01) |
| *G06F 16/9032* | (2019.01) |
| *G10L 15/08* | (2006.01) |

(52) U.S. Cl.
CPC .... *G10L 15/1815* (2013.01); *G06F 16/90332* (2019.01); *G06F 17/27* (2013.01); *G10L 15/02* (2013.01); *G10L 15/16* (2013.01); *G10L 15/22* (2013.01); *G10L 2015/088* (2013.01)

(58) Field of Classification Search
CPC ................ G10L 15/22; G10L 15/1815; G10L 2015/088; G10L 15/02; G10L 15/16; G10L 15/18; G10L 17/06; G06F 17/279; G06F 17/28; G06F 17/27
USPC ........................................................ 704/257
See application file for complete search history.

(56) References Cited

U.S. PATENT DOCUMENTS

2017/0140755 A1* 5/2017 Andreas ................ G06F 17/241
2018/0060301 A1* 3/2018 Li ....................... G06F 17/2775

* cited by examiner

*Primary Examiner* — Yogeshkumar Patel
(74) *Attorney, Agent, or Firm* — Hodgson Russ LLP

(57) ABSTRACT

Embodiments of the present disclosure provide a method and a device for managing a dialogue based on artificial intelligence. The method includes the followings. An optimum system action is determined from at least one candidate system action according to a current dialogue status feature, a candidate system action feature and surrounding feedback information of the at least one candidate system action and based on a decision model. Since the current dialogue status corresponding to the current dialogue status feature includes uncertain results of natural language understanding, the at least one candidate system action acquired according to the current dialogue status also includes the uncertain results of natural language understanding.

20 Claims, 7 Drawing Sheets

METHOD AND DEVICE FOR MANAGING DIALOGUE BASED ON ARTIFICIAL INTELLIGENCE

CROSS-REFERENCE TO RELATED APPLICATIONS

This application is based on and claims priority to Chinese Patent Application No. 201710518293.6, filed on Jun. 29, 2017, the entire contents of which are incorporated herein by reference.

TECHNICAL FIELD

The present disclosure relates to the field of intelligent human-computer interaction technology, and more particularly, to a method and a device for managing a dialogue based on artificial intelligence.

BACKGROUND

Artificial intelligence (AI for short) is a new technical science studying and developing theories, methods, techniques and application systems for simulating, extending and expanding human intelligence. AI is a branch of computer science, which attempts to know the essence of intelligence and to produce an intelligent robot capable of acting as a human. The researches in this field include robots, voice recognition, image recognition, natural language processing and expert systems, etc.

A spoken dialogue system is a human-computer interaction system that tries to understand languages spoken by a user and respond to the user effectively, which is widely applied to fields of information searching (such as searching weather, flight schedules, train schedules), travelling, tickets reserving and the like.

The spoken dialogue system mainly includes an automatic speech recognizer (ASR for short), a natural language understanding (NLU for short), a dialogue manager (DM for short), a natural language generation (GLU for short) and a text-to-speech synthesis (TTS for short).

As the natural language understanding (NLU) is limited by an understanding ability of an existing robot, or as the user implicitly express him/her requirements in one searching, an uncertainty of understanding the user's requirements by the natural language understanding (NLU) exists in a certain degree. As such, the natural language understanding (NLU) outputs a plurality of understanding results which include certain understanding results and uncertain understanding results.

In related arts, the dialogue manager (DM) employs a predetermined rule to select a certain understanding result among the plurality of understanding results and updates a dialogue status, further abandons other understanding results, and configures a particular action trigger by using a static rule in a system action trigger and action decision model.

However, in related arts, there are some technical problems in the method of updating the dialogue status by selecting the certain understanding result via the natural language understanding, such as it is impossible to solve a technical problem in a scene where understandings have uncertainty or user's expressions have ambiguity.

SUMMARY

Embodiments of the present disclosure provide a method for managing a dialogue based on AI. The method includes: receiving current dialogue information; determining a user intention of the current dialogue information; determining query dimension distribution information and current single-round slot distribution information of the current dialogue information under the user intention; generating current multi-round slot distribution information according to the current single-round slot distribution information of the current dialogue information and historical multi-round slot distribution information of historical dialogue information; generating a current dialogue status according to the user intention, the query dimension distribution information and the current multi-round slot distribution information of the current dialogue information; performing a first feature extraction on the current dialogue status to obtain a current dialogue status feature; determining at least one candidate system action according to the current dialogue status and a pre-configured rule; performing a second feature extraction on the at least one candidate system action to obtain a candidate system action feature of each of the at least one candidate system; and inputting the current dialogue status feature, the candidate system action feature of each of the at least one candidate system and surrounding feedback information of the at least one candidate system action to a decision model, in which the decision model is configured to determine an optimum system action from the at least one candidate system action.

Embodiments of the present disclosure provide a computer device including a processor and a memory. The processor is configured to run a program corresponding to executable program codes by reading the executable program codes stored in the memory, to realize the above method for managing a dialogue based on AI.

Embodiments of the present disclosure provide a computer program product. When instructions in the computer program product are executed by a processor, the above method for managing a dialogue based on AI is executed.

Embodiments of the present disclosure provide a non-transitory computer readable storage medium having a computer program stored thereon. When the computer program is executed by a processor, the above method for managing a dialogue based on AI is executed.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
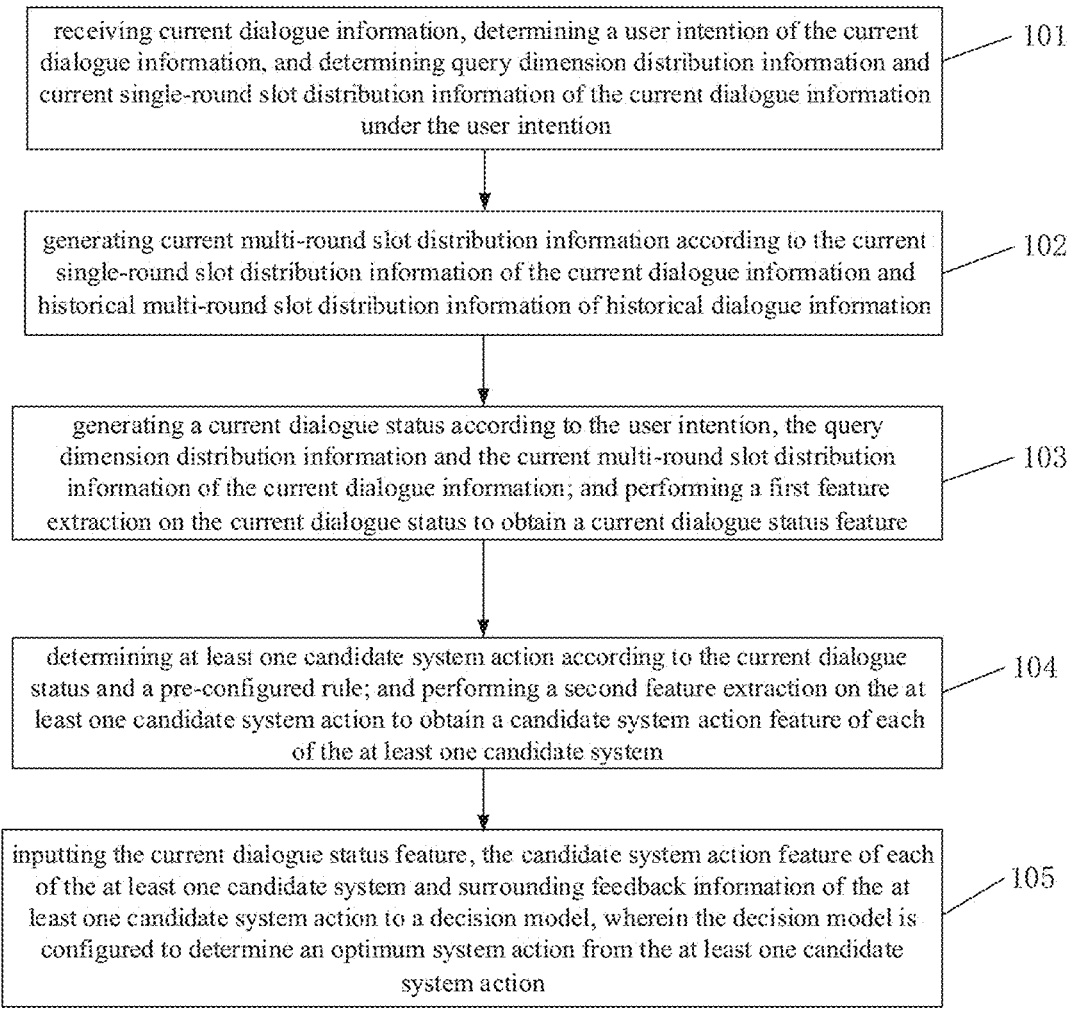
FIG. 1 is a flow chart illustrating a method for managing a dialogue based on AI according to embodiment one of the present disclosure.

Embodiments of the present disclosure will be described in detail and examples of the embodiments are illustrated in the drawings. The same or similar elements and the elements having the same or similar functions are denoted by like reference numerals throughout the descriptions. The embodiments described herein with reference to the drawings are explanatory, serve to explain the present disclosure, and are not construed to limit the present disclosure.

A method and a device for managing a dialogue based on AI according to embodiments of the present disclosure will be described with reference to the drawings.

FIG. 1 is a flow chart illustrating a method for managing a dialogue based on AI according to an embodiment of the present disclosure. As illustrated in FIG. 1, the method for managing a dialogue based on AI includes the followings.

In block 101, current dialogue information is received, a user intention of the current dialogue information is determined, and query dimension distribution information and current single-round slot distribution information of the current dialogue information under the user intention are determined.

In detail, the current dialogue information may be a structural representation that is understandable by machine and is formed after a series of processes (such as automatic speech recognition, natural language understanding) are performed on a current speech input of a user. For example, ASR performs speech recognition on the current speech input of the user to obtain a recognized result; and NLU performs natural language understanding on the recognized result and outputs the structural representations of the current speech input to DB.

For example, the current speech input of the user may be "Beijing tomorrow weather". NLU may determine that the user intention is to "inquire weather" by means of the natural language understanding, such as semantic analysis, syntax analysis, grammar analysis and the like. The query dimension distribution information of the user intention is illustrated as FIG. 1 for example.

It is to be noted that, the query dimension distribution information of the user intention illustrated as FIG. 1 may be adjusted according to refined user intentions. For example, the user performs two rounds of dialogue with the spoken dialogue system. The speech input of the user is "Beijing tomorrow weather" in a first round of dialogue; while the speech input of the user is "it's going to rain in Beijing tomorrow" in a second round of dialogue. Although the user intentions of the two rounds of dialogue are both to "inquire weather", the user intention of the second round of dialogue is finer than that of the first round of dialogue. As such, a probability value of SYS_WEATHER included in the query dimension distribution information in the first round of dialogue is large, for example the probability value of SYS_WEATHER is 0.81. A probability value of SYS_RAIN included in the query dimension distribution information in the second round of dialogue is large, for example the probability value of SYS_RAIN is 0.8.

TABLE 1

| query dimension | probability |
| --- | --- |
| SYS_WEATHER | 0.81 |
| SYS_CLOUDY | 0.02 |
| SYS_RAIN | 0.01 |
| SYS_SNOW | 0.03 |
| SYS_SUNNY | 0.02 |
| SYS_WIND | 0.08 |
| SYS_TEMP | 0.01 |
| SYS_LOW_TEMP | 0.01 |
| SYS_HIGH_TEMP | 0.01 |
| SYS_AQI | 0 |
| SYS_CLOTHES | 0 |
| SYS_WASH_CAR | 0 |
| SYS_TRIP | 0 |
| SYS_INFLUENZA | 0 |
| SYS_EXERCISE | 0 |
| SYS_ULTRAVIOLET | 0 |
| SYS_FOG | 0 |

In detail, the current single-round slot distribution information in embodiments is obtained according to conditions of filling each slot of a semantic list with all current dialogue keywords of the current dialogue information. Compared to the related arts where a dialogue keyword with a large probability value is selected from the semantic list to update a dialogue status, the current single-round slot distribution information provided in embodiments covers all current dialogue keywords, which may better understand user's requirements and improve user experience.

In order to acquire the current single-round slot distribution information, it requires determining the conditions that each slot of the semantic list is filled with the current dialogue keywords firstly. A particular implementation may include the followings.

Firstly, N current dialogue keywords of the current dialogue information are determined, where N is a natural number. For example, NLU segments the speech input of the use to obtain a plurality of segmentations. Each of the plurality of segmentations corresponds to one dialogue keyword. For example, the speech input "Beijing tomorrow weather" is segmented to obtain three segmentations "Beijing", "tomorrow" and "weather". Then, the segmentations are screened to obtain the dialogue keywords related to the semantic list, for example, two segmentations "Beijing" and "tomorrow" are obtained.

Secondly, the semantic list corresponding to the user intention is acquired. The semantic list includes M slots, where M is a natural number. In detail, semantic lists related to user intentions are arranged in the spoken dialogue system in advance. When the speech input of the user is inputted into NLU the spoken language system, the spoken language system automatically generates the semantic list corresponding to the user intention of the speech input. It is to be noted that, when the N current dialogue keywords are determined, N semantic lists may be acquired. The semantic lists are mutually independent from each other. For example, the semantic list corresponding to "weather query" includes two slots. One is "location" slot and another one is "time" slot. Illustrated as Table 2, the semantic list is filled with "Beijing"; while illustrated as Table 3, the semantic list is filled with "tomorrow". That is, two semantic lists corresponding two current dialogue keywords are determined.

TABLE 2

| slot | slot value | probability |
|---|---|---|
| location | Beijing | 0.96 |
| time | Beijing | 0.04 |

TABLE 3

| slot | slot value | probability |
|---|---|---|
| location | tomorrow | 0.07 |
| time | tomorrow | 0.93 |

Figure 2:
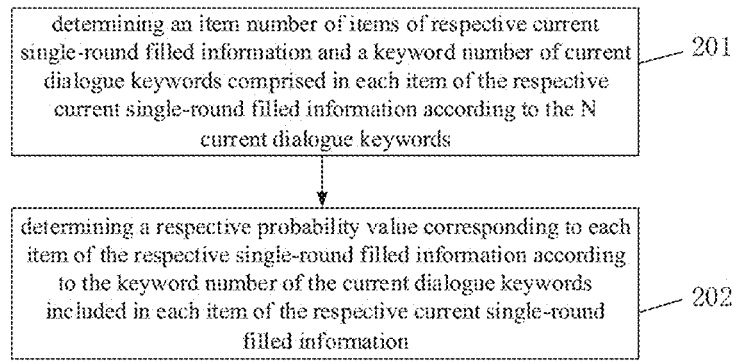
FIG. 2 is a flow chart illustrating a method for managing a dialogue based on AI according to embodiment two of the present disclosure.

A first probability value that each slot is filled with each current dialogue keyword is determined and a second probability value that each slot is not filled by each current dialogue keyword is determined. After the semantic lists corresponding to the current dialogue keywords are acquired, it is easy to acquire the first probability value of filling each slot with each current dialogue keyword and the second probability value of not filling each slot with each current dialogue keyword rapidly. Referring to FIG. 2, for the dialogue keyword "Beijing", the first probability value of filling the "location" slot with "Beijing" is 0.96 and the second probability value of not filling the "location" slot with "Beijing" is 1-0.96 (i.e. 0.04); the first probability value of filling the "time" slot with "Beijing" is 0.04 and the second probability value of not filling the "time" slot with "Beijing" is 1-0.04 (i.e. 0.96).

Referring to FIG. 2, for the dialogue keyword "Beijing", it is possible to fill "Beijing" in the "location" slot; while it is also possible to fill "Beijing" in the "time" slot. Although the probability value of filling "Beijing" in the "time" slot is lower than that of filling "Beijing" in the "location" slot, it is a certain event once "Beijing" is filled in the "time" slot.

Therefore, the current single-round slot distribution information in embodiments covers all dialogue keywords of the current dialogue information and all conditions that each slot is filled with all dialogue keywords. Both the dialogue keywords and the conditions that each slot is filled with the all dialogue keywords represent all results of natural language understanding, which includes certain results of natural language understanding and uncertain results of natural language understanding. Therefore, when the dialogue status is updated and a corresponding system action is triggered by the current single-round slot distribution information subsequently, the spoken dialogue system may solve a technical problem of a scene where understandings have uncertainty or user's expressions have ambiguity.

In block 102, current multi-round slot distribution information is generated according to the current single-round slot distribution information of the current dialogue information and historical multi-round slot distribution information of historical dialogue information.

In detail, same with inclusion of the uncertain results of natural language understanding in the current single-round slot distribution information, the historical multi-round slot distribution information also includes the uncertain results of natural language understanding, and thus generated current multi-round slot distribution information also includes the uncertain results of natural language understanding. When a decision model makes a decision to the uncertain results subsequently by employing a current dialogue status feature of the current dialogue status generated according to the current multi-round slot distribution information, compared to the related arts where certain results are used to make the decision, embodiments of the present disclosure may solve the technical problem of the scene where the understandings have uncertainty or the user's expressions have ambiguity.

In block 103, the current dialogue status is generated according to the user intention, the query dimension distribution information and the current multi-round slot distribution information of the current dialogue information, and a first feature extraction is performed on the current dialogue status to acquire the current dialogue status feature.

In detail, a first status feature corresponding to the user intention of the current dialogue information is extracted, a second status feature corresponding to the query dimension distribution information is extracted, and a third status feature corresponding to the current multi-round slot distribution information is extracted. According to the first status feature, the second status feature and the third status feature, the current dialogue status feature is generated. The implementations of extracting dialogue status features are not limited in embodiments.

In block 104, at least one candidate system action is determined according to the current dialogue status and a pre-configured rule, and a second feature extraction is performed on the at least one system candidate action to acquire a candidate system action feature of each of the at least one candidate system.

In detail, a large amount of system actions are stored in the spoken dialogue system, such as a recommending action, a clarification action, an information satisfaction and the like. Moreover, the spoken dialogue system further defines the pre-configured rule. When the current dialogue status satisfies the pre-configured rule, the at least one candidate system action is determined by the spoken dialogue system from the large amount of system actions. Implementations of performing the feature extraction on the at least one candidate system action are not limited in embodiments. The extracted candidate system action feature will be inputted into the decision model subsequently.

In block 105, the current dialogue status feature, the candidate system action feature of each of the at least one candidate system and surrounding feedback information of the at least one candidate system action are inputted into the decision model. The decision model is configured to determine an optimum system action from the at least one candidate system action.

In detail, the decision model may be obtained via learning and training. Preferably, a reinforcement learning model is obtained according to the current dialogue status feature, the candidate system action feature and the surrounding feedback information of the candidate system action, and through online incremental learning and training. The reinforcement learning model aims at forming the surrounding feedback information (also called as a feedback and evaluation signal) through continuous interactions and trial errors between an agent and surroundings without participations of outside "teacher", and aims at obtaining an optimum strategy adapted to the surroundings by adjusting actions according to the surrounding feedback information. Therefore, the spoken dialogue system may achieve an online incremental learning by continuously performing dialogues with the user, acquiring the user's feedback, and performing a self-learning and a self-adjustment. Such a dynamic learning mode is more flexible than a static mode arranged with rules. Rules of the dynamic learning mode are obtained by learning and acquiring the feedback through the continuous interactions between the spoken dialogue system and the user. Therefore, the spoken dialogue system has generalization ability and a better universal property.

As a possible implementation, the spoken dialogue system is designed to incorporate an interaction interface with regard to the surrounding feedback information of the user. For example, a display card is designed on an interaction surface of a dialogue management system, functioning as the interaction interface of the spoken dialogue system for receiving the surrounding feedback information of the user. As an example, a click operation of the user on the display card is a positive feedback in a single round, while no click operation of the user on the display card is a negative feedback in the single round. When the spoken dialogue system receives the positive feedback, the spoken dialogue system determines that a selected system action is the optimum system action. Otherwise, the spoken dialogue system continues to select a next system action from the at least one candidate system action until the received surrounding feedback information is the positive feedback.

It is to be noted that, after the optimum system action is obtained, the spoken dialogue system performs natural language generation operation on the optimum system action to form an interaction language fed back to the user. In detail, GLU and TTS may be used to perform the natural language generation operation on the optimum system action, but embodiments of the present disclosure are not limited thereto. For example, GLU converts the optimum system action into the natural language understandable by the user. TTS converts the natural language outputted by GLU into a speech and then broadcasts the speech to the user.

FIG. 2 is a flow chart illustrating a method for managing a dialogue based on AI according to embodiment two of the present disclosure. The embodiment illustrated as FIG. 2 is mainly to describe in detail a determination of the current single-round distribution information in the method for managing a dialogue based on AI illustrated as FIG. 1. When the semantic list corresponding to the user intention includes M slots, it needs to determine respective current single-round slot distribution information for each of the M slots. And the current single-round slot distribution information is generated with the respective current single-round slot distribution information of each slot. The determination of the respective current single-round slot distribution information of a $j^{th}$ slot is taken as an example for illustration in embodiments, where j is a natural number greater than or equal to 1 and smaller than or equal to M.

As illustrated in FIG. 2, the method for managing a dialogue based on AI includes the followings.

In block 201, an item number of items of respective current single-round filled information and a keyword number of current dialogue keywords included in each item of the respective current single-round filled information are determined according to the N current dialogue keywords.

In detail, filling a slot with each of the dialogue keywords are mutually independent events from each other. For example, if it is determined that two current dialogue keywords are "Beijing" and "tomorrow", and the $j^{th}$ slot in embodiments is the "location" slot, the event of filling "Beijing" in the "location" slot and the event of filling "Beijing" in the "time" slot are mutually independent events. According to a probability rule for simultaneous occurrence of mutually independent events based on probability statistics, there are $2^2$ events (i.e. 4 events) corresponding to a filling of the "location" slot. The four events of the $j^{th}$ slot include that "Beijing" and "tomorrow" are not filled in the "location" slot, "Beijing" is filled in the "location" slot but "tomorrow" is not filled in the "location" slot, "Beijing" is not filled in the "location" slot but "tomorrow" is filled in the "location" slot, and "Beijing" and "tomorrow" are filled in the "location" slot. Therefore, in embodiments, $2^N$ items of respective single-round filled information may be easily and rapidly determined according to the N current dialogue keywords, and each item of respective single-round filled information corresponds to an event of the $j^{th}$ slot.

In block 202, a respective probability value corresponding to each item of the respective current single-round filled information is determined according to the keyword number of the current dialogue keywords included in each item of the respective current single-round filled information, to form the respective current single-round slot distribution information of each slot.

In detail, according to descriptions made to the block 202, the events of filling the dialogue keywords in one slot are mutually independent from each other. According to the probability rule for simultaneous occurrence of mutually independent events based on probability statistics, the respective probability value of each event may be determined easily and rapidly.

In a possible implementation, a particular implementation of the block 202 may include the followings.

When it is determined that each item of the respective current single-round filled information includes n current dialogue keywords, a first product value of each first probability value that the $j^{th}$ slot is filled with the n current dialogue keywords is acquired and a second product value of each second probability value that the $j^{th}$ slot is not filled with N-n current dialogue keywords (not included in each item of respective current single-round filled information of each item) is acquired.

The respective probability value corresponding to each item of the respective current single-round filled information is determined according to the first product value and the second product value.

It is to be noted that, n is a natural number greater than or equal to 0 and smaller than or equal to N. When n equals to 0, the first product value is 1 as default. When n equals to N, the second product value is 1 as default.

For example, the N current dialogue keywords determined are $x_1$ and $x_2$. The first probability value of filling the $j^{th}$ slot with $x_1$ is $P(x_1)$ and the second probability value of not filling the $j^{th}$ slot with $x_1$ is $P(\overline{x_1})$. The first probability value of filling the $j^{th}$ slot with $x_2$ is $P(x_2)$ and the second probability value of not filling the $j^{th}$ slot with $x_2$ is $P(\overline{x_2})$.

Table 4 illustrates the respective current single-round slot distribution information of the $j^{th}$ slot. As illustrated in Table 4, there are $2^N$ items included in the respective current single-round slot distribution information of the $j^{th}$ slot. The respective current single-round filled information of the item "empty" in the Table 4 indicates an event that $x_1$ and $x_2$ are not filled in the $j^{th}$ slot. The respective probability value corresponding to this item of the respective current single-round filled information is $P(\overline{x_1})*P(\overline{x_2})$. The first product value is 1, and the second product value is $P(\overline{x_1})*P(\overline{x_2})$. The respective current single-round filled information of the item "$x_1$" in the Table 4 indicates an event that $x_1$ is filled in the $j^{th}$ slot but $x_2$ is not filled in the $j^{th}$ slot. The respective probability value corresponding to this item of the respective current single-round filled information is $P(x_1)*P(\overline{x_2})$. The first product value is $P(x_1)$, and the second product value is $P(\overline{x_2})$. The respective current single-round filled information of the item "$x_2$" in the Table 4 indicates an event that $x_1$ is not filled in the $j^{th}$ slot but $x_2$ is filled in the $j^{th}$ slot. The respective probability value corresponding to this item of the respective current single-round filled information is $P(\overline{x_1})*P(x_2)$. The first product value is $P(x_2)$, and the second product value is $P(\overline{x_1})$. The respective current single-round filled information of the item "$x_1*x_2$" in the Table 4 indicates an event that $x_1$ and $x_2$ are both filled in the $j^{th}$ slot. The respective probability value corresponding to this item of the respective current single-round filled information is $P(x_1)*P(x_2)$. The first product value is $P(x_1)*P(x_2)$, and the second product value is 1.

TABLE 4

| respective current single-round filled information of the $j^{th}$ slot | probability value |
| --- | --- |
| empty | $P(\overline{x_1}) * P(\overline{x_2})$ |
| $x_1$ | $P(x_1) * P(\overline{x_2})$ |
| $x_2$ | $P(\overline{x_1}) * P(x_2)$ |
| $x_1 * x_2$ | $P(x_1) * P(x_2)$ |

With the method for managing a dialogue based on AI according to embodiments of the present disclosure, the item number of items of the respective current single-round filled information is determined according to the N current dialogue keywords. The respective probability value corresponding to each item of the respective current single-round filled information is determined according to the keyword number of the current dialogue keywords included in each item of the respective single-round filled information, and thus the current single-round slot distribution information is acquired. In other words, the current single-round slot distribution information covers all dialogue keywords of the current dialogue and all conditions of filling the all dialogue keywords in each slot. The dialogue keywords and the conditions of filling the dialogue keywords in each slot indicate all results of natural language understanding, which include certain results of natural language understanding and uncertain results of natural language understanding. Therefore, the dialogue status is updated and a corresponding system action is triggered by the current single-round slot distribution information subsequently, the spoken dialogue system may solve the technical problem in a scene where understandings have uncertainty or user's expressions have ambiguity.

Figure 3:
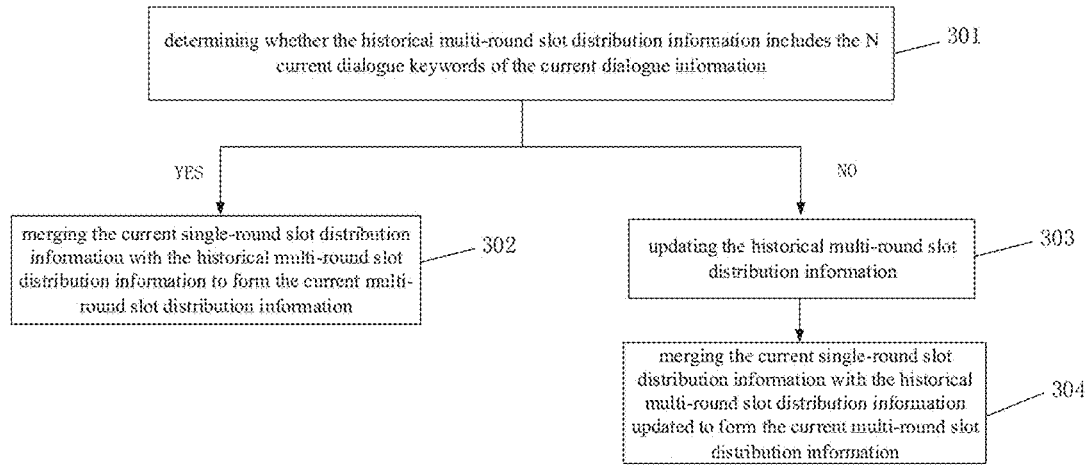
FIG. 3 is a flow chart illustrating a method for managing a dialogue based on AI according to embodiment three of the present disclosure.

FIG. 3 is a flow chart illustrating a method for managing a dialogue based on AI according to embodiment three of the present disclosure. The embodiment illustrated as FIG. 3 is mainly to describe in detail the generation of the current multi-round slot distribution information according to the current single-round slot distribution information of the current dialogue information and the historical multi-round slot distribution information of historical dialogue information in the method for managing a dialogue based on AI illustrated as FIG. 1.

As illustrated in FIG. 3, the method for managing a dialogue based on AI includes the followings.

In block 301, it is determined whether the historical multi-round slot distribution information includes the N current dialogue keywords of the current dialogue information. If yes, a block 302 is performed, and if no, a block S303 is performed.

In detail, the historical multi-round slot distribution information includes Q rounds of historical single-round slot distribution information, where Q is a natural number. In embodiments, the particular implementation of the block 301 may include the followings. It is determined whether each round of historical single-round slot distribution information includes the N current dialogue keywords of the current dialogue information. For example, each round of the historical single-round slot distribution information is analyzed, to determine whether each round of historical single-round slot distribution information includes the N current dialogue keywords of the current dialogue information. The N current dialogue keywords represent all current dialogue keywords of the current dialogue information. When a round of historical single-round slot distribution information including some of the current dialogue keywords (i.e. smaller than the N current dialogue keywords) of the current dialogue information exits in the Q rounds of historical single-round slot distribution information, it requires updating this round of historical single-round slot distribution information. Since remaining (Q−1) rounds of historical single-round slot distribution information includes all current dialogue keywords (i.e. the N current dialogue keywords) of the current dialogue information, it does not require updating the remaining (Q−1) rounds of historical single-round slot distribution information.

In block 302, the current single-round slot distribution information and the historical multi-round slot distribution information are merged to form the current multi-round slot distribution information.

In block 303, the historical multi-round slot distribution information is updated, and a block 304 is executed.

In detail, after the block 301, it is determined that a $q^{th}$ round of historical single-round slot distribution information does not include the N current dialogue keywords of the current dialogue information, it needs to update the $q^{th}$ round of historical single-round slot distribution information to update the historical multi-round slot distribution information, where q is a natural number greater than or equal to 1 and smaller than or equal to Q.

In a possible implementation, a particular implementation of updating the $q^{th}$ round of historical single-round slot distribution information includes the followings.

Firstly, the number of current dialogue keywords that are not included in the $q^{th}$ round of historical slot distribution information is determined.

Secondly, when it is determined that a $f^{th}$ item of historical single-round filled information of the $q^{th}$ round of historical single-round slot distribution information does not include i current dialogue keywords, a fourth product value obtained by multiplying a third product value of each second probability value that the $j^{th}$ slot is not filled with the i current dialogue keywords with a respective probability value corresponding to the $f^{th}$ item of historical single-round filled information of the $q^{th}$ round is taken as a updated respective probability value corresponding to the $f^{th}$ item of historical single-round slot distribution information to update the $q^{th}$ round of historical single-round slot distribution information. The $q^{th}$ round of historical single-round slot distribution information includes F items of historical single-round filled information, where f is a natural number greater than or equal to q and smaller than or equal to F, and i is a natural number greater than or equal to 1 and smaller than or equal to N.

In block 304, the current single-round slot distribution information and the updated historical multi-round slot distribution information are merged to form the current multi-round slot distribution information.

For example, two rounds of dialogue are performed between the user and the spoken dialogue system. When the second round of dialogue is being performed, the first round of dialogue is the historical dialogue. Since there are only two rounds of dialogue, the historical multi-round slot distribution information refers to the first round of single-round slot distribution information.

There are two dialogue keywords $x_1$ and $x_2$ in the first round of dialogue. The first round of single-round slot distribution information is illustrated as Table 4.

There are two dialogue keywords $y_1$ and $y_2$ in the second round of dialogue. The second round of single-round slot distribution information is illustrated as Table 5. The second round of single-round slot distribution information is determined referring to the method illustrated as FIG. 2. In detail, the respective current single-round filled information of the item "empty" in Table 5 indicates an event that $y_1$ and $y_2$ are not filled in the $j^{th}$ slot. The respective probability value corresponding to this item of the respective current single-round filled information is $P(\overline{y_1})*P(\overline{y_2})$. The respective current single-round filled information of the item "$y_1$" in Table 5 indicates an event that $y_1$ is filled in the $j^{th}$ slot but $y_2$ is not filled in the $j^{th}$ slot. The respective probability value corresponding to this item of the respective current single-round filled information is $P(y_1)*P(\overline{y_2})$. The respective current single-round filled information of the item "$y_2$" in Table 5 indicates an event that $y_1$ is not filled in the $j^{th}$ slot but $y_2$ is filled in the $j^{th}$ slot. The respective probability value corresponding to this item of the respective current single-round filled information is $P(\overline{y_1})*P(y_2)$. The respective current single-round filled information of the item "$y_1*y_2$" in Table 5 indicates an event that $y_1$ is not filled in the $j^{th}$ slot but $y_2$ is filled in the $j^{th}$ slot. The respective probability value corresponding to this item of the respective current single-round filled information of this item is $P(y_1)*P(y_2)$.

TABLE 5

| respective current single-round filled information of the $j^{th}$ slot | probability value |
| --- | --- |
| empty | $P(\overline{y_1}) * P(\overline{y_2})$ |
| $y_1$ | $P(y_1) * P(\overline{y_2})$ |
| $y_2$ | $P(\overline{y_1}) * P(y_2)$ |
| $y_1 * y_2$ | $P(y_1) * P(y_2)$ |

It can be seen from above descriptions, after the second round of dialogue, the current multi-round slot distribution information may be determined as appropriate. One exemplary occasion is that: when the two dialogue keywords $x_1$ and $x_2$ in the first round of dialogue are same with the two dialogue keywords $y_1$ and $y_2$ in the second round of dialogue, the current multi-round slot distribution information is formed by merging the first round of single-round slot distribution information and the second round of single-round slot distribution information. Such the current multi-sounds slot distribution information formed in this occasion is illustrated as Table 5, i.e. a cover-typed merging. Another exemplary occasion is that: the two dialogue keywords $x_1$ and $x_2$ in the first round are both different from the two dialogue keywords $y_1$ and $y_2$ in the second round, the first round of single-round slot distribution information is updated, and the current multi-round slot distribution information is formed by merging the updated first round of single-round slot distribution information and the second round of single-round slot distribution information, illustrated as Table 6. Certainly, there are many other forms of the current multi-round slot distribution information, and no more examples are listed herein.

TABLE 6

| current single-round filled information of the $j^{th}$ slot | probability value |
| --- | --- |
| empty | $P(\overline{x_1}) * P(\overline{x_2}) * P(\overline{y_1}) * P(\overline{y_2})$ |
| $x_1$ | $P(x_1) * P(\overline{x_2}) * P(\overline{y_1}) * P(\overline{y_2})$ |
| $x_2$ | $P(\overline{x_1}) * P(x_2) * P(\overline{y_1}) * P(\overline{y_2})$ |
| $x_1 * x_2$ | $P(x_1) * P(x_2) * P(\overline{y_1}) * P(\overline{y_2})$ |
| $y_1$ | $P(y_1) * P(\overline{y_2})$ |
| $y_2$ | $P(\overline{y_1}) * P(y_2)$ |
| $y_1 * y_2$ | $P(y_1) * P(y_2)$ |

With the method for managing a dialogue based on AI according to embodiments of the present disclosure, the current multi-round slot distribution information is generated by merging the current single-round slot distribution information of the current dialogue information and the historical multi-round slot distribution information of the historical dialogue information. Same with inclusion of the uncertain results of natural language understanding in the current single-round slot distribution information, the historical multi-round slot distribution information also includes the uncertain results of natural language understanding, and thus generated current multi-round slot distribution information also includes the uncertain results of natural language understanding. When a decision model makes a decision to the uncertain results subsequently by employing a current dialogue status feature of the current dialogue status generated according to the current multi-round slot distribution information, compared to the related arts where certain results are used to make the decision, embodiments of the present disclosure may solve the technical problem of the scene where the understandings have uncertainty or the user's expressions have ambiguity.

Figure 4:
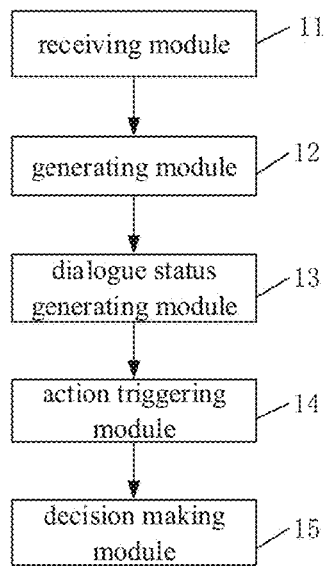
FIG. 4 is a block diagram illustrating a device for managing a dialogue based on AI according to embodiment four of the present disclosure.

FIG. 4 is a block diagram illustrating a device for managing a dialogue based on AI according to embodiment four of the present disclosure. As illustrated in FIG. 4, the device includes a receiving module 11, a generating module 12, a dialogue status generating module 13, an action triggering module 14 and a decision making module 15.

The receiving module 11 is configured to receive current dialogue information, to determine a user intention of the current dialogue information, and to determine query dimension distribution information and current single-round slot distribution information of the current dialogue information under the user intention.

The generating module 12 is configured to generate current multi-round slot distribution information according to the current single-round slot distribution information of the current dialogue information and historical multi-round slot distribution information of historical dialogue information.

The dialogue status generating module 13 is configured to generate a current dialogue status according to the user intention, the query dimension distribution information and the current multi-round slot distribution information of the current dialogue information, and to perform a first feature extraction on the current dialogue status to obtain a current dialogue status feature.

The action triggering module 14 is configured to determine at least one candidate system action according to the current dialogue status and a pre-configured rule and to perform a second feature extraction on the at least one candidate system action to obtain a candidate system action feature of each of the at least one candidate system.

The decision making module 15 is configured to input the current dialogue status feature, the candidate system action feature of each of the at least one candidate system and surrounding feedback information of the at least one candidate system action to a decision model. The decision model is used to determine an optimum system action from the at least one candidate system action.

With the device for managing a dialogue based on AI according to embodiments of the present disclosure, the decision model in the decision making module is used to determine the optimum system action from the at least one candidate system action according to the current dialogue status feature, the candidate system action feature and the surrounding feedback information of the candidate system action. Since the current dialogue status corresponding to the current dialogue status feature includes uncertain results of natural language understanding, the at least one candidate system action acquired according to the current dialogue status also includes the uncertain results of natural language understanding. As such, the decision model may make a decision to the uncertain results of natural language understanding. Compared to the related arts where certain results are used to make the decision, embodiments of the present disclosure may solve the technical problem of the scene where the understandings have uncertainty or the user's expressions have ambiguity, thereby understanding the user's requirements more accurately, and improving user experience.

Figure 5:
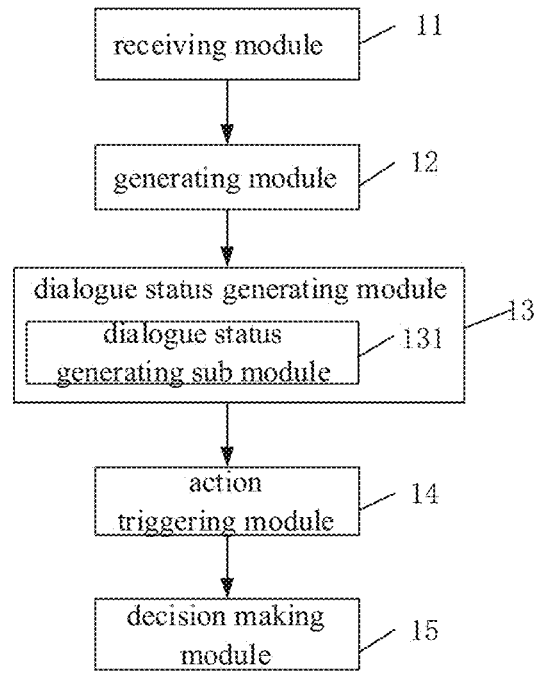
FIG. 5 is a block diagram illustrating a device for managing a dialogue based on AI according to embodiment five of the present disclosure.
Figure 6:
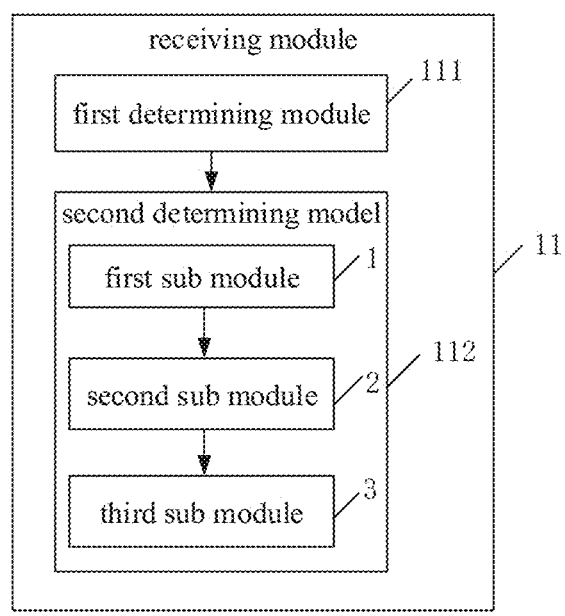
FIG. 6 is a block diagram illustrating a receiving module included in a device for managing a dialogue based on AI according to embodiment five of the present disclosure.
Figure 7:
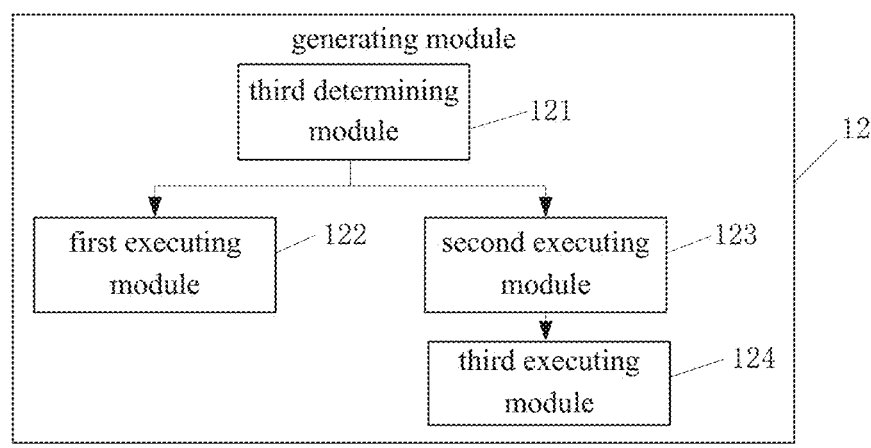
FIG. 7 is a block diagram illustrating a generating module included in a device for managing a dialogue based on AI according to embodiment five of the present disclosure.

FIG. 5 is a block diagram illustrating a device for managing a dialogue based on AI according to embodiment five of the present disclosure. FIG. 6 is a block diagram illustrating a receiving module included in a device for managing a dialogue based on AI according to embodiment five of the present disclosure. FIG. 7 is a block diagram illustrating a generating module included in a device for managing a dialogue based on AI according to embodiment five of the present disclosure. Referring to FIGS. 5 to 7, the followings may be described.

The receiving module 11 is configured to receive current dialogue information, to determine a user intention of the current dialogue information, and to determine query dimension distribution information and current single-round slot distribution information of the current dialogue information under the user intention.

Further, the receiving module 11 includes a first determining module 111. The first determining module 111 is configured to, before the current single-round slot distribution information is determined, determine N current dialogue keywords of the current dialogue information, where N is a natural number. Furthermore, the first determining module 111 is configured to acquire a semantic list corresponding to the user intention. The semantic list includes M slots and M is a natural number. Moreover, the first determining module 111 is configured to determine a first probability value that each of the M slots is filled with each of the N current dialogue keywords, and to determine a second probability value that each of the M slots is not filled with each of the N current dialogue keywords.

In addition, the receiving module 11 further includes a second determining model 112. The second determining module 112 includes a first sub model 1, a second sub module 2 and a third sub module 3.

The first sub model 1 is configured to, for each of the M slots, determine an item number of items of respective current single-round filled information and a keyword number of current dialogue keywords included in each item of the respective current single-round filled information according to the N current dialogue keywords.

The second sub module 2 is configured to, for each of the M slots, determine a respective probability value corresponding to each item of the respective single-round filled information according to the keyword number of the current dialogue keywords included in each item of the respective current single-round filled information to form respective current single-round slot distribution information of each slot.

Further, the second sub module 2 is specifically configured to, when it is determined that each item of the respective current single-round filled information comprises n current dialogue keywords, acquire a first product value of each first probability value that a $j^{th}$ slot is filled with the n current dialogue keywords and acquire a second product value of each second probability value that the $j^{th}$ slot is not filled with N-n current dialogue keywords, where n is a natural number greater than 0 and not greater than N. and j is a natural number equal to or greater than 1 and smaller than or equal to M; and to determine the respective probability value corresponding to each item of the respective single-round filled information according to the first product value and the second product value.

The third sub module 3 is configured to generate the current single-round slot distribution information by using the respective current single-round slot distribution information of each slot.

The device further includes a generating module 12. The generating module 12 is configured to generate current multi-round slot distribution information according to the current single-round slot distribution information of the current dialogue information and historical multi-round slot distribution information of historical dialogue information.

Further, the generating module 12 includes a third determining module 121, a first executing module 122, a second executing module 123 and a third executing module 124.

The third determining module 121 is configured to determine whether the historical multi-round slot distribution information includes the N current dialogue keywords of the current dialogue information, to activate the first executing module 122 if yes, and to activate the second executing module 123 if no;

The historical multi-round slot distribution information includes Q rounds of historical single-round slot distribution information, where Q is a natural number. The third determining module 121 is further configured to determine respectively whether each round of the historical single-round slot distribution information comprises the N current dialogue keywords of the current dialogue information.

The first executing module 122 is configured to merge the current single-round slot distribution information with the historical multi-round slot distribution information to form the current multi-round slot distribution information.

The second executing module 123 is configured to update the historical multi-round slot distribution information.

Further, the second executing module 123 is configured to, when it is determined that a $q^{th}$ round of historical single-round slot distribution information does not comprise the N current dialogue keywords of the current dialogue information, update the $q^{th}$ round of historical multi-round slot distribution information to update the historical multi-round slot distribution information, where q is a natural number greater than or equal to 1 and smaller than or equal to Q.

Further, the second executing module 123 is configured to, when it is determined that an $f^{th}$ item of historical single-round filled information in the $q^{th}$ round of the historical single-round slot distribution information does not include i current dialogue keywords, take a fourth product value obtained by multiplying a third product value of each second probability value that the $j^{th}$ slot is not filled with the i current dialogue keywords with a respective probability value corresponding to the $f^{th}$ item of historical single-round filled information of the $q^{th}$ round as a updated respective probability value corresponding to the $f^{th}$ item of historical single-round slot distribution information to update the $q^{th}$ round of historical single-round slot distribution information, in which the $q^{th}$ round of historical single-round slot distribution information includes F items if historical single-round filled information, f is a natural number greater than or equal to q and smaller than or equal to F, and i is a natural number greater than or equal to 1 and smaller than or equal to N.

The third executing module 124 is configured to merge the current single-round slot distribution information with the historical multi-round slot distribution information updated to form the current multi-round slot distribution information.

The device further includes a dialogue status generating module 13. The dialogue status generating module 13 is configured to generate a current dialogue status according to the user intention, the query dimension distribution information and the current multi-round slot distribution information of the current dialogue information, and to perform a first feature extraction on the current dialogue status to obtain a current dialogue status feature.

Further, the dialogue status generating module 13 includes a dialogue status generating sub module 131.

The dialogue status generating sub module 131 is configured to extract a first status feature corresponding to the user intention, a second status feature corresponding to the query dimension distribution information and a third status feature corresponding to the current multi-round slot distribution information.

Furthermore, the dialogue status generating sub module 131 is further configured to generate the current dialogue status feature according to the first status feature, the second status feature and the third status feature.

The device further includes an action triggering module 14. The action triggering module 14 is configured to determine at least one candidate system action according to the current dialogue status and a pre-configured rule and to perform a second feature extraction on the at least one candidate system action to obtain a candidate system action feature of each of the at least one candidate system.

The device further includes a decision making module 15. The decision making module 15 is configured to input the current dialogue status feature, the candidate system action feature of each of the at least one candidate system and surrounding feedback information of the at least one candidate system action to a decision model. The decision model is used to determine an optimum system action from the at least one candidate system action.

The decision model is a reinforcement learning model.

The reinforcement learning model is obtained according to the current dialogue status feature, the candidate system action feature and the surrounding feedback information of the candidate system action, and through online incremental learning and training.

With the device for managing a dialogue based on AI according to embodiments of the present disclosure, the decision model in the decision making module is used to determine the optimum system action from the at least one candidate system action according to the current dialogue status feature, the candidate system action feature and the surrounding feedback information of the candidate system action. Since the current dialogue status corresponding to the current dialogue status feature includes uncertain results of natural language understanding, the at least one candidate system action acquired according to the current dialogue status also includes the uncertain results of natural language understanding. As such, the decision model may make a decision to the uncertain results of natural language understanding. Compared to the related arts where certain results are used to make the decision, embodiments of the present disclosure may solve the technical problem of the scene where the understandings have uncertainty or the user's expressions have ambiguity, thereby understanding the user's requirements more accurately, and improving user experience.

Figure 8:
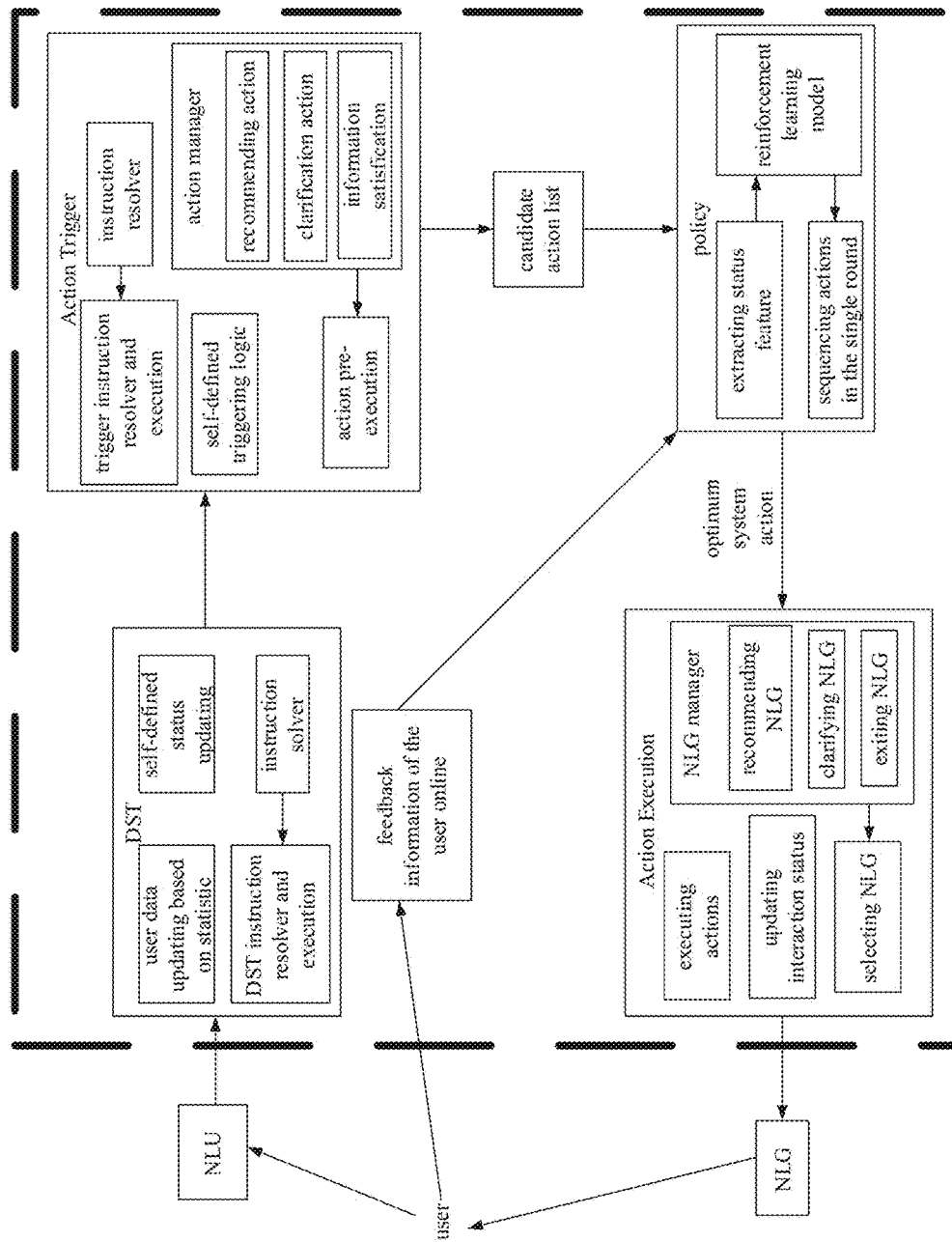
FIG. 8 is a block diagram illustrating an exemplary spoken dialogue system according to an embodiment of the present disclosure.
Figure 9:
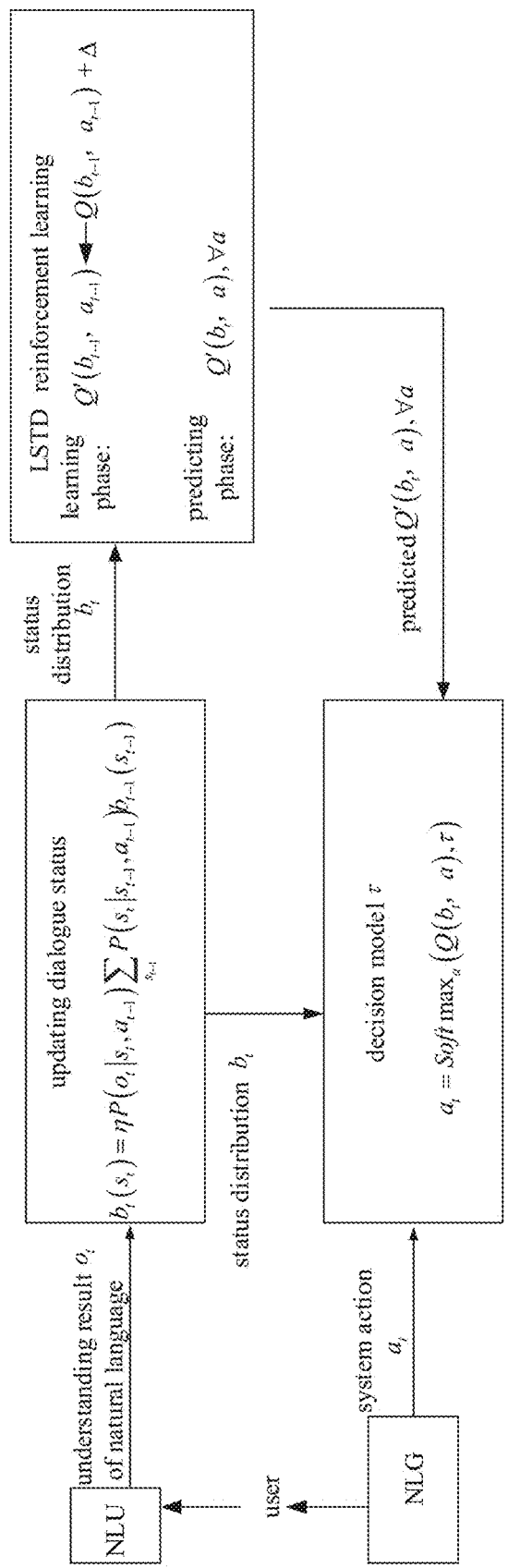
FIG. 9 is a mathematical model related to an exemplary spoken dialogue system according to an embodiment of the present disclosure.

FIG. 8 is a block diagram illustrating an exemplary spoken dialogue system according to an embodiment of the present disclosure. FIG. 9 is a mathematical model related to an exemplary spoken dialogue system according to an embodiment of the present disclosure. Referring to FIGS. 8 and 9, the spoken dialogue system mainly includes a natural language understanding (NLU) device, a dialogue state tracking (DST) module, an action trigger, a policy module, an action execution module, and a natural language generator (NLG).

The NLU device is configured to understand the natural language of the user and to convert natural language requirements inputted by the user into the structural representations understandable by machine. Referring to FIGS. 8 and 9, the understanding result $o_t$ of the natural language is outputted by the NLU device to the DST module.

The DST module is configured to update dialogue status information of the user. That is, the DST module is configured to update the dialogue status information according to the understanding results of the NLU device. Referring to FIGS. 8 and 9, a mathematical model related to the DST module is represented as:

$$b_t(s_t) = \eta P(o_t \mid s_t, a_{t-1}) \sum_{s_{t-1}} P(s_t \mid s_{t-1}, a_{t-1}) b_{t-1}(s_{t-1}),$$

where $s_t$ represents a current status value, $b_t(s_t)$ represents a current dialogue status, $P(o_t \mid s_t, a_{t-1})$ represents a probability value of occurring $o_t$ when the status value is $s_t$ and a last system action is $a_{t-1}$; $\eta$ represents an empirical coefficient, ranging from 0 to 1; $P(s_t \mid s_{t-1}, a_{t-1})$ represents a probability value of occurring $s_t$ when the status value is $s_{t-1}$ and a last system action is $a_{t-1}$; $b_{t-1}(s_{t-1})$ represents a last dialogue status; and $$\sum_{s_{t-1}} P(s_t \mid s_{t-1}, a_{t-1}) b_{t-1}(s_{t-1})$$

represents a product of a plurality of historical dialogue statuses and corresponding probability values. In other words, the DST module is configured to generate the current dialogue status through the above mathematical model and in combination with the historical dialogue statuses.

The action trigger is configured to determine and select a series of possible candidate system actions according to the updated user status, and to form a candidate system action list. Referring to FIGS. 8 and 9, a LSTD reinforcement learning model is used to acquire the candidate system action list.

The policy module is configured to select an optimum system action by sequencing the candidate system actions triggered by the action trigger and to predict a subsequent user behavior. It is to be noted that, the policy module employs the LSTD based reinforcement learning model to sequence the candidate system actions. The reinforcement learning is one of hot study topics in the field of machine learning and smart controlling. The reinforcement learning aims at forming the surrounding feedback information (also called as a feedback and evaluation signal) through continuous interactions and trial errors between an agent and surroundings without participations of outside "teacher", and aims at obtaining an optimum strategy adapted to the surroundings by adjusting actions according to the surrounding feedback information. Compared with supervised learning, the reinforcement learning contains several elements: adaptability, reactivity, and incremental learning. The agent continuously uses the surrounding feedback information to improve its performances. The agent can acquire status action rules directly from experiences. The reinforcement learning is an incremental learning that can be used online. For example, referring to FIG. 9, the LSTD reinforcement learning can use an action value function $Q(b_{t-1}, a_{t-1})$ corresponding to the last system action and an incremental value $\Delta$ obtained by the LSTID reinforcement learning to acquire the action value function $Q'(b_{t-1}, a_{t-1})$ corresponding to the current system action, during a learning phase. The LSTD reinforcement learning can predict the action value function $Q'(b_t, a)$, $\forall a$ corresponding to the optimum system action, during a prediction phase. It is to be noted that, the mathematical model used of the incremental value obtain by the LSTD reinforcement learning is $\Delta=\alpha \times \{r_{t-1}+\gamma \times \max_a Q(b_t, a')-Q(b_{t-1}, a_{t-1})\}$, where $\alpha$ represents a learning rate ranging from 0 to 1; $r_{t-1}$ represents a record, related to user feedback date, $\gamma$ represents a discount factor ranging from 0 to 1; $\max_a Q(b_1, a')$ represents a feature optimum Q value evaluation corresponding to the optimum system action; and $Q(b_{t-1}, a_{t-1})$ represents the action value function corresponding to the last system action.

Referring to FIG. 9, the action value function corresponding to the predicted optimum system action $Q'(b_t, a)$, $\forall a$ is inputted into the decision model. The decision model outputs the optimum system action $a_t$=Soft $\max_a(Q(b_t, a),\tau)$. It is to be noted that, the decision model employs a softmax model in particular, and implementations of the softmax model may be referred to prior arts, which are not elaborated herein.

The action execution module is configured to execute the optimum system action selected by the decision model.

The natural language generator is configured to generate the language result that is ultimately presented to the user based on the execution results of the action execution module.

The dialogue state tracking (DST) module, the action trigger, the policy module and the action execution module form a dialogue management device. The dialogue state tracking (DST) module is integrated with functions of the receiving module 11, the generating module 12 and the dialogue status generating module 13 illustrated in FIGS. 4 and 5. The action trigger is integrated with functions of the action triggering module 14 illustrated in FIGS. 4 and 5. The policy module is integrated with functions of the action triggering module 15 illustrated in FIGS. 4 and 5.

The spoken dialogue system illustrated as FIG. 8 has following advantages.

1) The reinforcement learning technology is used in sequencing the candidate system actions and in predicting a next user behavior, which may achieve data-driven interaction strategy and have following benefit effects.

a) The spoken dialogue system may achieve an online incremental learning by continuously performing dialogue with the user, acquiring the user's feedback, and performing a self-learning and a self-adjustment.

b) Such a dynamic learning mode is more flexible than a static mode arranged with rules. Rules of the dynamic learning mode are obtained by learning and acquiring the feedback through the continuous interaction with the user.

c) The reinforcement learning is a universal and widely available solution. Different types of vertical fields can use the same reinforcement learning solution.

2) Maintenance of statistical dialogue statuses by the DST module allows uncertain understanding results to be stored via a distributed form in multi-round of dialogue statuses of the user. The decision model uses the data-driven reinforcement learning model to make a decision to the uncertainties, compared to previous certain status representations, being more able to characterize and deal with the uncertainties.

Figure 10:
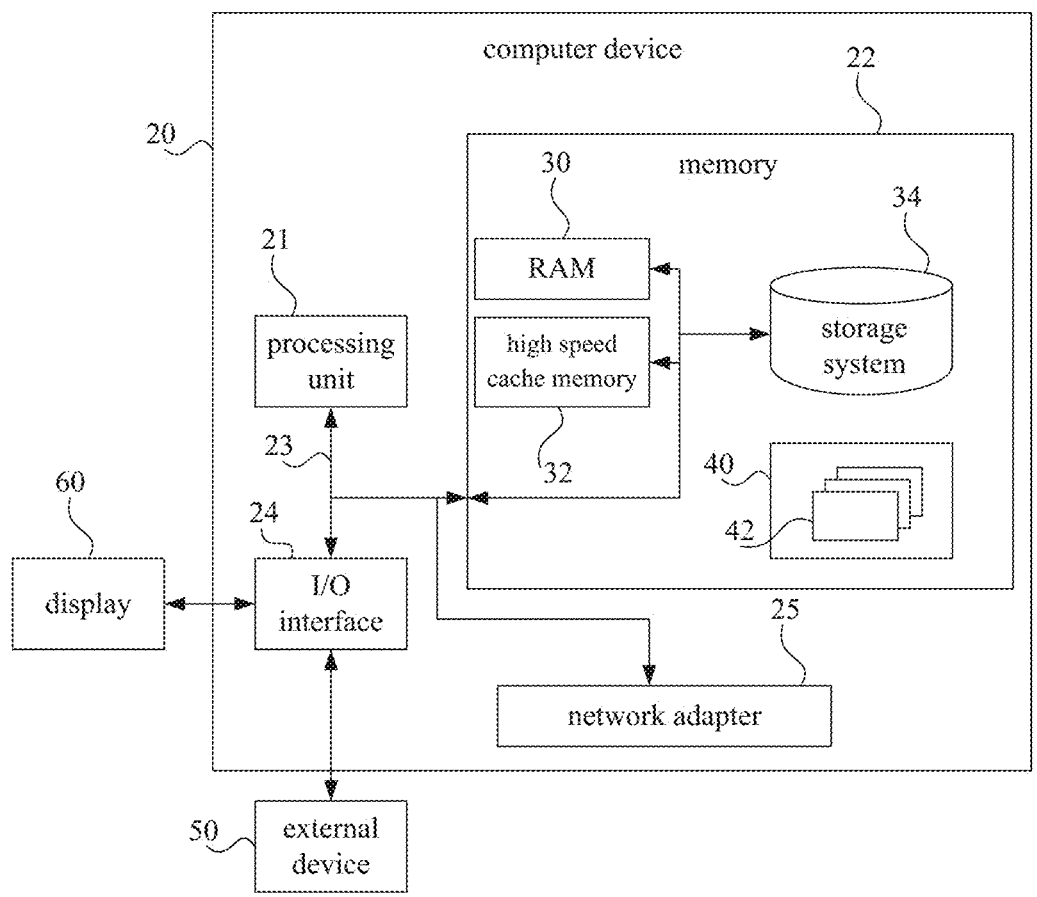
FIG. 10 is a block diagram illustrating an exemplary computer device suitable for realizing implementations of the present disclosure.

FIG. 10 is a block diagram illustrating an exemplary computer device 20 suitable for realizing implementations of the present disclosure. FIG. 10 illustrates just one example of the computer device 20, which is not construed to limit the functions and scopes of embodiments of the present disclosure.

As illustrated in FIG. 10, the computer device 20 is implemented as a general computation device. Components of the computer device 20 may include but are not limited to: one or more processors or processing units 21; a system memory 22; and a bus 23 connecting various system components including the system memory 22 and the processing units 21.

The bus 23 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 20 typically includes a variety of computer system readable media. These media may be any available media accessible by the computer device 20 and includes both volatile and non-volatile media, removable and non-removable media.

The system memory 22 may include a computer system readable medium in the form of volatile memory, such as a random access memory (hereinafter referred to as RAM) 30 and/or a high speed cache memory 32. The computer device 20 may further include other removable or non-removable, volatile or non-volatile computer system storage media. By way of example only, the storage system 34 may be configured to read and write a non-removable and non-volatile magnetic media (not shown in FIG. 10, commonly referred to as a "hard drive"). Although not shown in FIG. 10, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 23 via one or more data medium interfaces. The memory 22 may include at least one program product. The program product has a set (such as, at least one) of program modules configured to perform the functions of various embodiments of the present disclosure.

A program/utility 4 having a set (at least one) of the program modules 42 may be stored in, for example, the memory 22. Such the program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 20 may also communicate with one or more external devices 50 (such as, a keyboard, a pointing device, a display 60, etc.). Furthermore, the computer device 20 may also communicate with one or more communication devices enabling a user to interact with the computer device 20 and/or other devices (such as a network card, modem, etc.) enabling the computer device 20 to communicate with one or more computer devices. This communication can be performed via the input/output (I/O) interface 24. Also, the computer device 20 may communicate with one or more networks (such as a local area network (hereafter referred to as LAN), a wide area network (hereafter referred to as WAN) and/or a public network such as an Internet) through a network adapter 25. As shown in FIG. 10, the network adapter 25 communicates with other modules of the computer device 20 over the bus 23. It should be understood that, although not shown in FIG. 10, other hardware and/or software modules may be used in connection with the computer device 20. The hardware and/or software includes, but is not limited to, microcode, device drivers, redundant processing units, external disk drive arrays, RAID systems, a magnetic tape driver and a data backup storage system.

The processing unit 21 is configured to execute various functional applications and data processing by running programs stored in the system memory 22, for example, implementing the method for managing a dialogue based on AI illustrated as FIGS. 1 to 3.

Any combination of one or more computer readable media may be adopted. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of a carrier which carries computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In order to achieve the above embodiments, embodiments of the present disclosure further provide a computer program product. When instructions in the computer program product are executed by a processor, the aforesaid method for managing a dialogue based on artificial intelligence is executed.

In order to achieve the above embodiments, embodiments of the present disclosure further provide a non-transitory computer readable storage medium. The non-transitory computer readable storage medium has a computer program stored thereon. When the computer program is executed by a processor, the aforesaid method for managing a dialogue based on artificial intelligence is executed.

In the description of the present disclosure, reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples. Besides, any different embodiments and examples and any different characteristics of embodiments and examples may be combined by those skilled in the art without contradiction.

In addition, terms such as "first" and "second" are used herein for purposes of description and are not construed as indicating or implying relative importance or significance. Therefore, the feature defined with "first" and "second" may comprise one or more this feature. Furthermore, in the description of the present disclosure, "a plurality of" means at least two, such as two, three and more, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A method for managing a dialogue based on artificial intelligence, comprising:
   receiving current dialogue information;
   determining a user intention of the current dialogue information;
   determining query dimension distribution information and current single-round slot distribution information of the current dialogue information under the user intention;
   generating current multi-round slot distribution information according to the current single-round slot distribution information of the current dialogue information and historical multi-round slot distribution information of historical dialogue information;
   generating a current dialogue status according to the user intention, the query dimension distribution information and the current multi-round slot distribution information of the current dialogue information;
   performing a first feature extraction on the current dialogue status to obtain a current dialogue status feature;
   determining at least one candidate system action according to the current dialogue status and a pre-configured rule;
   performing a second feature extraction on the at least one candidate system action to obtain a candidate system action feature of each of the at least one candidate system; and
   inputting the current dialogue status feature, the candidate system action feature of each of the at least one candidate system and surrounding feedback information of the at least one candidate system action to a decision model, wherein the decision model is configured to determine an optimum system action from the at least one candidate system action;
   wherein the query dimension distribution information comprises a plurality of query dimensions, and each query dimension has a probability corresponding to the user intention; and
   wherein the historical multi-round slot distribution information comprises uncertain results of natural language understanding.

2. The method according to claim 1, wherein before determining the current single-round slot distribution information, the method further comprises:
   determining N current dialogue keywords of the current dialogue information, wherein N is a natural number;

acquiring a semantic list corresponding to the user intention, wherein the semantic list comprises M slots and M is a natural number; and determining a first probability value that each of the M slots is filled with each of the N current dialogue keywords, and determining a second probability value that each of the M slots is not filled with each of the N current dialogue keywords.

3. The method according to claim 2, wherein determining the current single-round slot distribution information comprises:

for each of the M slots, determining an item number of items of respective current single-round filled information and a keyword number of current dialogue keywords comprised in each item of the respective current single-round filled information according to the N current dialogue keywords; and determining a respective probability value corresponding to each item of the respective single-round filled information according to the keyword number of the current dialogue keywords comprised in each item of the respective current single-round filled information, to form respective current single-round slot distribution information of each slot; and generating the current single-round slot distribution information by using the respective current single-round slot distribution information of each slot.

4. The method according to claim 3, wherein determining the respective probability value corresponding to each item of the respective single-round filled information according to the keyword number of the current dialogue keywords comprised in each item of the respective current single-round filled information comprises:

when it is determined that each item of the respective current single-round filled information comprises n current dialogue keywords, acquiring a first product value of each first probability value that a $j^{th}$ slot is filled with the n current dialogue keywords and acquiring a second product value of each second probability value that the $j^{th}$ slot is not filled with N-n current dialogue keywords, wherein n is a natural number greater than 0 and not greater than N, and j is a natural number equal to or greater than 1 and smaller than or equal to M; and determining the respective probability value corresponding to each item of the respective single-round filled information according to the first product value and the second product value.

5. The method according to claim 4, wherein generating the current multi-round slot distribution information according to the current single-round slot distribution information and the historical multi-round slot distribution information of the historical dialogue information, comprises:

determining whether the historical multi-round slot distribution information comprises the N current dialogue keywords of the current dialogue information;

if yes, merging the current single-round slot distribution information with the historical multi-round slot distribution information to form the current multi-round slot distribution information; and if no, updating the historical multi-round slot distribution information; and merging the current single-round slot distribution information with the historical multi-round slot distribution information updated to form the current multi-round slot distribution information.

6. The method according to claim 5, wherein the historical multi-round slot distribution information comprises Q rounds of historical single-round slot distribution information, wherein Q is a natural number;

wherein determining whether the historical multi-round slot distribution information comprises the N current dialogue keywords of the current dialogue information comprises:

determining respectively whether each round of the historical single-round slot distribution information comprises the N current dialogue keywords of the current dialogue information;

wherein if no, updating the historical multi-round slot distribution information comprises:

when it is determined that a $q^{th}$ round of historical single-round slot distribution information does not comprise the N current dialogue keywords of the current dialogue information, updating the $q^{th}$ round of historical single-round slot distribution information to update the historical multi-round slot distribution information, where q is a natural number greater than or equal to 1 and smaller than or equal to Q.

7. The method according to claim 6, wherein updating the $q^{th}$ round of the historical single-round slot distribution information when it is determined that an $f^{th}$ item of historical single-round filled information in the $q^{th}$ round of the historical single-round slot distribution information does not comprise i current dialogue keywords, comprises:

taking a fourth product value obtained by multiplying a third product value of each second probability value that the $j^{th}$ slot is not filled with the i current dialogue keywords with a respective probability value corresponding to the $f^{th}$ item of historical single-round filled information of the $q^{th}$ round as a updated respective probability value corresponding to the $f^{th}$ item of historical single-round slot distribution information to update the $q^{th}$ round of historical single-round slot distribution information, wherein the $q^{th}$ round of historical single-round slot distribution information comprises F items of historical single-round filled information, f is a natural number greater than or equal to q and smaller than or equal to F, and i is a natural number greater than or equal to 1 and smaller than or equal to N.

8. The method according to claim 1, wherein performing the first feature extraction on the current dialogue status to generate the current dialogue status feature comprises:

extracting a first status feature corresponding to the user intention, a second status feature corresponding to the query dimension distribution information and a third status feature corresponding to the current multi-round slot distribution information; and generating the current dialogue status feature according to the first status feature, the second status feature and the third status feature.

9. The method according to claim 8, wherein the decision model is a reinforcement learning model;

the reinforcement learning model is obtained according to the current dialogue status feature, the candidate system action feature and the surrounding feedback information of the candidate system action, and through online incremental learning and training.

10. A computer device, comprising: a processor and a memory;

wherein the processor is configured to run a program corresponding to executable program codes by reading the executable program codes stored in the memory, to realize acts of:

receiving current dialogue information;

determining a user intention of the current dialogue information;

determining query dimension distribution information and current single-round slot distribution information of the current dialogue information under the user intention;

generating current multi-round slot distribution information according to the current single-round slot distribution information of the current dialogue information and historical multi-round slot distribution information of historical dialogue information;

generating a current dialogue status according to the user intention, the query dimension distribution information and the current multi-round slot distribution information of the current dialogue information;

performing a first feature extraction on the current dialogue status to obtain a current dialogue status feature;

determining at least one candidate system action according to the current dialogue status and a pre-configured rule;

performing a second feature extraction on the at least one candidate system action to obtain a candidate system action feature of each of the at least one candidate system; and inputting the current dialogue status feature, the candidate system action feature of each of the at least one candidate system and surrounding feedback information of the at least one candidate system action to a decision model, wherein the decision model is configured to determine an optimum system action from the at least one candidate system action;

wherein the query dimension distribution information comprises a plurality of query dimensions, and each query dimension has a probability corresponding to the user intention; and wherein the historical multi-round slot distribution information comprises uncertain results of natural language understanding.

11. The computer device according to claim 10, wherein the processor is further configured to realize acts of:

before determining the current single-round slot distribution information, determining N current dialogue keywords of the current dialogue information, wherein N is a natural number;

acquiring a semantic list corresponding to the user intention, wherein the semantic list comprises M slots and M is a natural number; and determining a first probability value that each of the M slots is filled with each of the N current dialogue keywords, and determining a second probability value that each of the M slots is not filled with each of the N current dialogue keywords.

12. The computer device according to claim 11, wherein the processor is configured to determine the current single-round slot distribution information by acts of:

for each of the M slots, determining an item number of items of respective current single-round filled information and a keyword number of current dialogue keywords comprised in each item of the respective current single-round filled information according to the N current dialogue keywords; and determining a respective probability value corresponding to each item of the respective single-round filled information according to the keyword number of the current dialogue keywords comprised in each item of the respective current single-round filled information, to form respective current single-round slot distribution information of each slot; and generating the current single-round slot distribution information by using the respective current single-round slot distribution information of each slot.

13. The computer device according to claim 12, wherein the processor is configured to determine the respective probability value corresponding to each item of the respective single-round filled information according to the keyword number of the current dialogue keywords comprised in each item of the respective current single-round filled information by acts of:

when it is determined that each item of the respective current single-round filled information comprises n current dialogue keywords, acquiring a first product value of each first probability value that a $j^{th}$ slot is filled with the n current dialogue keywords and acquiring a second product value of each second probability value that the $j^{th}$ slot is not filled with N-n current dialogue keywords, wherein n is a natural number greater than 0 and not greater than N, and j is a natural number equal to or greater than 1 and smaller than or equal to M; and determining the respective probability value corresponding to each item of the respective single-round filled information according to the first product value and the second product value.

14. The computer device according to claim 13, wherein the processor is configured to generate the current multi-round slot distribution information according to the current single-round slot distribution information and the historical multi-round slot distribution information of the historical dialogue information by acts of:

determining whether the historical multi-round slot distribution information comprises the N current dialogue keywords of the current dialogue information;

if yes, merging the current single-round slot distribution information with the historical multi-round slot distribution information to form the current multi-round slot distribution information; and if no, updating the historical multi-round slot distribution information; and merging the current single-round slot distribution information with the historical multi-round slot distribution information updated to form the current multi-round slot distribution information.

15. The computer device according to claim 14, wherein the historical multi-round slot distribution information comprises Q rounds of historical single-round slot distribution information, wherein Q is a natural number;

the processor is configured to determine whether the historical multi-round slot distribution information comprises the N current dialogue keywords of the current dialogue information by acts of: determining respectively whether each round of the historical single-round slot distribution information comprises the N current dialogue keywords of the current dialogue information;

the processor is configured to update the historical multi-round slot distribution information by acts of: when it is determined that a $q^{th}$ round of historical single-round slot distribution information does not comprise the N current dialogue keywords of the current dialogue information, updating the $q^{th}$ round of historical single-round slot distribution information to update the historical multi-round slot distribution information, where q is a natural number greater than or equal to 1 and smaller than or equal to Q.

16. The computer device according to claim 15, wherein the processor is configured to update the CO round of the historical single-round slot distribution information when it is determined that an $f^{th}$ item of historical single-round filled information in the $q^{th}$ round of the historical single-round slot distribution information does not comprise i current dialogue keywords by acts of:
   taking a fourth product value obtained by multiplying a third product value of each second probability value that the $j^{th}$ slot is not filled with the i current dialogue keywords with a respective probability value corresponding to the $f^{th}$ item of historical single-round filled information of the $q^{th}$ round as a updated respective probability value corresponding to the $f^{th}$ item of historical single-round slot distribution information to update the $q^{th}$ round of historical single-round slot distribution information, wherein the $q^{th}$ round of historical single-round slot distribution information comprises F items of historical single-round filled information, f is a natural number greater than or equal to q and smaller than or equal to F, and i is a natural number greater than or equal to 1 and smaller than or equal to N.

17. The computer device according to claim 10, wherein the processor is configured to perform the first feature extraction on the current dialogue status to generate the current dialogue status feature by acts of:
   extracting a first status feature corresponding to the user intention, a second status feature corresponding to the query dimension distribution information and a third status feature corresponding to the current multi-round slot distribution information; and
   generating the current dialogue status feature according to the first status feature, the second status feature and the third status feature.

18. The computer device according to claim 17, wherein the decision model is a reinforcement learning model;
   the reinforcement learning model is obtained according to the current dialogue status feature, the candidate system action feature and the surrounding feedback information of the candidate system action, and through online incremental learning and training.

19. A non-transitory computer readable storage medium, having a computer program stored thereon, wherein when the computer program is executed by a processor, a method for managing a dialogue based on artificial intelligence is executed, the method comprising:
   receiving current dialogue information;
   determining a user intention of the current dialogue information;
   determining query dimension distribution information and current single-round slot distribution information of the current dialogue information under the user intention;
   generating current multi-round slot distribution information according to the current single-round slot distribution information of the current dialogue information and historical multi-round slot distribution information of historical dialogue information;
   generating a current dialogue status according to the user intention, the query dimension distribution information and the current multi-round slot distribution information of the current dialogue information;
   performing a first feature extraction on the current dialogue status to obtain a current dialogue status feature;
   determining at least one candidate system action according to the current dialogue status and a pre-configured rule;
   performing a second feature extraction on the at least one candidate system action to obtain a candidate system action feature of each of the at least one candidate system; and
   inputting the current dialogue status feature, the candidate system action feature of each of the at least one candidate system and surrounding feedback information of the at least one candidate system action to a decision model, wherein the decision model is configured to determine an optimum system action from the at least one candidate system action;
   wherein the query dimension distribution information comprises a plurality of query dimensions, and each query dimension has a probability corresponding to the user intention; and
   wherein the historical multi-round slot distribution information comprises uncertain results of natural language understanding.

20. The non-transitory computer readable storage medium according to claim 19, wherein before determining the current single-round slot distribution information, the method further comprises:
   determining N current dialogue keywords of the current dialogue information, wherein N is a natural number;
   acquiring a semantic list corresponding to the user intention, wherein the semantic list comprises M slots and M is a natural number; and
   determining a first probability value that each of the M slots is filled with each of the N current dialogue keywords, and determining a second probability value that each of the M slots is not filled with each of the N current dialogue keywords.

* * * * *